3,410,928
BLENDS OF AN OLEFIN HIGH POLYMER WITH AN ETHYLENE/ACRYLIC ACID COPOLYMER
Bernard O. Baum, Plainfield, N.J., assignor to Union Carbide Corporation, a corporation of New York
No Drawing. Filed June 19, 1962, Ser. No. 203,475
11 Claims. (Cl. 260—897)

ABSTRACT OF THE DISCLOSURE

This invention is directed to polymeric compositions which exhibit improved adhesivity, printability, and stress crack resistance. More specifically, this invention relates to polyolefin blends comprising an ethylene or propylene homopolymer or an ethylene copolymer with an ethylene/acrylic acid copolymer. The ethylene/acrylic acid copolymer includes ethylene/acrylic acid/vinyl acetate terpolymers and ethylene/acrylic acid/acrylate terpolymers.

---

The invention relates to mixture of olefin high polymers and ethylene/acrylic acid copolymers. In a particular aspect, the invention relates to intimate mixtures of olefin high polymers and ethylene/acrylic acid copolymers which exhibit greatly improved adhesivity, printability, grease resistance, and stress crack resistance compared with olefin high polymers alone.

Olefin high polymers, especially olefin hydrocarbon homopolymers such as polyethylene, and to a lesser extent olefin hydrocarbon copolymers with other unsaturated monomers, are non-polar and adhere poorly to glass, wood, oxygen-barrier coatings, steel, aluminum, copper, and other substrates. Most of these olefin high polymers cannot be printed without pretreatment, and they have poor stress crack resistance.

It has now been discovered that surprising and marked improvement in adhesion, printability, grease resistance, and stress crack resistance can be obtained in olefin high polymers by the mixing therewith to substantial homogeneity, i.e., to the formation of an intimate admixture, of certain amounts of an ethylene/acrylic acid copolymer as hereinafter described.

The term "olefin high polymer" is used in the present specification and claims to denote normally solid homopolymers of monoolefinically unsaturated hydrocarbons having as many as 12 carbon atoms and normally solid copolymers thereof, such as, for example, these illustrative, but not restrictive, polymeric compounds: the normally solid polyethylenes of a density of from about 0.91 to about 0.97, as well as other olefin homopolymers such as polypropylene, polybutene-1, polypentene-1, and polyoctene-1, and olefin copolymers as for example, ethylene/propylene copolymers, ethylene/butene-1 copolymers, ethylene/pentene-1 copolymers, ethylene/3-methylpentene-1 copolymers, ethylene/hexene-1 copolymers, ethylene/bicyclo[2.2.1]hept-2-ene copolymers, ethylene/octene-1 copolymers, ethylene/decene-1 copolymers, and the like; and copolymers of monoolefinically unsaturated hydrocarbons with one or more other olefinically unsaturated monomers which are copolymerizable therewith, such as compounds containing the ethylene linkage >C=C<, for example, styrene, vinyl stearate, ethyl acrylate, vinyl acetate, monobutyl maleate, 2-ethyl hexyl acrylate, N-methyl-N-vinyl acetamide, acrylic acid, isopene, butadiene, bicycloheptene, bicyclopentadiene, and the like. Many other copolymerizable monomers which can also be used in addition to these illustrative compounds are well known to the art. Preferred olefin high polymers for use in this invention are those which contain at least 90 percent by weight of a combined monoolefinically unsaturated hydrocarbon having from 2 to 12 carbon atoms inclusive, and even more preferably, from 2 to 4 carbon atoms inclusive, i.e., ethylene, propylene, and butene-1.

Olefin high polymers and their methods of preparation are well known in the art. Inasmuch as the method of preparation is not critical to the success of the invention herein described, olefin high polymers produced by any method can be employed.

The olefin high polymers contemplated for use in the invention have a molecular weight sufficiently high that they are to be considered high polymers and not low molecular weight greasy polymers or waxes, i.e., they have a molecular weight of at least about 10,000 or a melt index of about 1,000 or less, and preferably a melt index of about 100 or less. The preferred olefin high polymer in the invention, polyethylene, has a density of from about 0.91 to about 0.97 and a melt index of less than about 100.

The olefin high polymers can comprise from about 20 percent by weight to about 99 percent by weight of the olefin high polymer-ethylene/acrylic acid copolymer mixture, although from about 60 percent by weight to about 95 percent by weight olefin high polymer in the mixture is preferred.

By the term ethylene/acrylic acid copolymer as used in the specification and claims of the present application is meant any ethylene copolymer, terpolymer, or multipolymer containing combined ethylene and combined acrylic acid, or containing combined ethylene, combined acrylic acid, and at least one monoolefinically unsaturated organic ester monomer copolymerizable therewith, particularly the vinyl or acrylic esters, as long as combined ethylene constitutes the major portion by weight of the polymer. Monoolefinically unsaturated organic esters which can be combined in the ethylene/acrylic acid copolymers include vinyl formate, vinyl acetate, vinyl chloroacetate, vinyl glycolate, vinyl cyanoacetate, vinyl propionate, vinyl butyrate, vinyl isobutyrate, vinyl 3-methoxypropionate, vinyl benzoate, vinyl cyclohexaneacetate, vinyl 2-hexanoate, vinyl nonanoate, vinyl 10,11-epoxyundecanoate, vinyl stearate, ketene dimer, and the like; methyl acrylate, ethyl acrylate, 2-chloroethyl acrylate, 2-cyanoethyl acrylate, 2,3-epoxybutyl acrylate, n-butyl acrylate, t-butyl acrylate, 2-ethoxyethyl acrylate, 2-dimethylaminoethyl acrylate, hexyl acrylate, 2-phenoxyethyl acrylate, 5-ethyl-2-pyridylethyl acrylate, dodecyl acrylate, and the like; methyl methacrylate, 2,3-epoxypropyl methacrylate, n-butyl methacrylate, t-butyl methacrylate, 2-(o-nitrophenoxy) ethyl methacrylate, 2-ethyl hexyl methacrylate, methacrylate ester with polyethylene glycol, and the like; isopropenyl esters such as isopropenyl acetate; allyl esters such as allyl carbamate, allyl acetate, allyl 2-ethylhexanoate, and cinnamyl acetate; butenoic esters such as the methyl and ethyl esters of 2-hydroxy-3-butenoic acid and the ethyl and allyl esters of 2-hydroxy-3-methyl-3-butenoic acid; maleic acid derivatives such as the dimethyl, diethyl, dipropyl, and dibutyl maleates, and bis(2-ethylhexyl)maleate; esters of maleamic acid; esters of fumaric acid; esters of itaconic acid and aconitic acid; the acetate ester of 1-propen-1-ol; the 1-diol diacetate of 2-butene-1; and crotonic acid esters such as 2-chloroethyl crotonate, the ethylene glycol monoester of crotonic acid, the lower alkyl crotonates, the ethylene glycol monoester of crotonic acid, the lower alkyl crotonates, 2,3-epoxypropyl crotonate, 2-phenoxyethyl crotonate, 4-hydroxy ethyl crotonate, and 3-cyanoethyl isocrotonate. These examples are merely illustrative of suitable comonomers, however, and are not restrictive of the comonomers which can be employed successfully in the ethylene/acrylic acid copolymer.

The preferred ethylene/acrylic acid copolymers for use in the invention are ethylene/acrylic acid/ethyl acrylate and ethylene-acrylic acid/vinyl acetate terpolymers.

Combined acrylic acid can constitute as much as 50 percent by weight of the ethylene/acrylic acid copolymer and as little as about 0.5 percent by weight of the copolymer if there are no other monomers copolymerized therewith. The preferred amount of combined acrylic acid in the copolymer is from about 2.5 percent by weight to about 10 percent by weight.

Monoolefinically unsaturated esters, if present in the ethylene/acrylic acid copolymer, can constitute as much as about 40 percent by weight of the copolymer, although the preferred amount of ester is from about 10 percent by weight to about 25 percent by weight of the copolymer.

Useful ethylene/acrylic acid copolymers have a melt index of less than about 1,000, and preferably less than about 100. These copolymers can be prepared by any method known in the art, such as by copolymerizing monomeric ethylene and acrylic acid, together or in combination with a monomer or monomers copolymerizable therewith as described before, in accordance with the process disclosed in U.S. Patent 2,391,218 to Bacon and Richardson.

The olefin high polymer-ethylene/acrylic acid copolymer mixture can comprise from about 1 percent by weight to about 80 percent by weight of the ethylene-acrylic acid copolymer. Preferably, the mixture comprises from about 60 percent by weight to about 95 percent by weight olefin high polymer and from about 5 percent by weight to about 40 percent by weight ethylene/acrylic acid copolymer.

The method in which the olefin polymer-ethylene/acrylic acid copolymer blend is prepared is not particularly critical to the success of the invention. Any conventional method which provides a homogeneous mixture can be employed. One method which has been found to be satisfactory is to flux the mixture and any desired additives in a Banbury mixer for a four to five minute cycle and then to work the material on a two-roll mill before transferring it into the rolls of a calender mill. It is also possible to have the mixing accomplished in a mixing extruder prior to forming the composition.

At the time of the blending or at any other time additives conventional in thermoplastic technology, including, but not limited to, modifiers, opacifiers, fillers, lubricants, stabilizers, colorants, and the like can be added to the compositions of the invention.

The compositions of this invention are useful as adhesives and coatings for wood, plastics, metals, and other substrates. They can also be molded and shaped into bottles and other containers.

The practice of the present invention is illustrated by the following examples wherein all parts and percentages are by weight.

EXAMPLES 1–11

In Examples 1–11, the olefin high polymer to be improved was fluxed on a two-roll mill at 110° C. and the ethylene/acrylic acid copolymer additive milled in immediately after fluxing. The time of working was about five minutes including ten end passes to ensure dispersion of the additive. Control samples were prepared in the same manner except that no ethylene/acrylic acid copolymer was added.

To determine stress crack resistance, a 125 mil compression molded specimen 0.5″ x 1.5″ was slit along the long dimension. The slit was 20 mils deep and 75 mils long. The specimen was then bent 180°. Ten such bent specimens were held in a channel which was then immersed in Hostapal (a non-ionic surfactant believed to be similar to nonyl phenoxy polyoxyethylene ethanol) at 50° C. in a test tube. Two such channel devices were put into each tube, providing twenty specimens per test. Time to failure of any one specimen was the appearance of a crack perpendicular to the slit; "$F_{50}$" is the time to failure of 50 percent (i.e., ten) of the specimens.

Melt index was measured at 190° C. and 44 p.s.i. in accordance with ASTM D-1238–57T.

Density was determined in accordance with ASTM D-1505–57T.

Grease resistance was determined in accordance with the procedure described in the Joint Army-Navy Specification for barrier materials, JAN-B-121, Amendment 2, Jan. 22, 1953.

Adhesion to wood, glass and steel was determined by placing a pellet made from a polymer mixture of this invention between two sheets of wood, glass, steel, epoxy or saran substrate, compressing the sheets on a 225° C. hot plate with a 500 gram weight, and then prying the samples apart.

To determine adhesion to an epoxy (the reaction product of an equimolar mixture of the diglycidyl ether of 2,2-bis(4-hydroxyphenyl)propane, and hardener, diethylene triamine), saran (vinylidene chloride copolymer with vinyl chloride and/or minor amount of other olefin monomers) and polyvinyl alcohol/trimethylol phenol (2:1 by weight) copolymer, an unreacted solution of the two epoxy components, a 20 percent by weight saran solution in carbon tetrachloride, and a 1 percent by weight solution of polyvinyl alcohol/trimethylolphenol copolymer in alcohol were brushed onto separate two inch square samples of the polymers of this invention. The samples were baked for one hour at 100° C. After the samples were allowed to cool the Scotch tape test was conducted: pressure sensitive cellophane tape was applied and peeled off. The degree of adhesion is gauged by the amount of the coating which is stripped from the sample by the pressure sensitive tape.

Printability was measured using a pressure sensitive cellophane tape test to determine the strength of the bond between a dried ink layer and a substrate. A strip of the sensitive cellophane tape approximately four inches long was applied to the surface of an ink printed plaque prepared from olefin high polymer-ethylene/acrylic acid copolymer and the tape smoothed under hand pressure. The ink adhesion of the printed sample is then determined by examining the tape for the amount of ink removed when the tape is withdrawn. The following rating system was used.

| Ink adhesion rating: | Amount of ink removed: |
|---|---|
| Excellent | None |
| Very good | Minute amount |
| Good | Less than 25% |
| Fair | 25–50% |
| Poor | More than 50% |

Table I is a compilation of data indicating the improvement in adhesion, grease resistance, printability, and stress crack resistance provided by the use of the olefin high polymer-ethylene/acrylic acid copolymer mixtures of the present invention.

TABLE I

| Example Number | Olefin High Polymer | Melt Index | Density | Additive | Additive Concentration, per cent by weight | Stress Cracking Hours to F₅₀ | Grease Resistance | Printability | Adhesion to — Glass | Wood | Steel | Epoxy | Saran | PVA/TMP |
|---|---|---|---|---|---|---|---|---|---|---|---|---|---|---|
| (Control 1) | Low Density Polyethylene | 2.0 | 0.92 | None | 0 | 2 | 2 | P | P | P | P | P | P | P |
| 1 | ...do... | 2.0 | 0.92 | Ethylene/acrylic acid [e] | 20 | >500 | 8 | G | | P-G | P-G | P-G | P-G | P-G |
| 2 | ...do... | 2.0 | 0.92 | Ethylene/ethyl acrylate/acrylic acid [f] | 20 | >500 | 8 | G | G | G | G | G | G | G |
| 3 | ...do... | 2.0 | 0.92 | Ethylene/vinyl acetate/acrylic acid [g] | 20 | >500 | 8 | G | G | G | G | G | G | G |
| 4 | ...do... | 2.0 | 0.945 | Ethylene/±butyl acrylate/acrylic acid [h] | 20 | >500 | 4 | P | | P-G | | | | |
| (Control 2) | High Density Polyethylene | 1.0 | 0.945 | None | 0 | | | | | P | | | | |
| 5 | ...do... | 1.0 | 0.96 | Ethylene/ethyl acrylate/acrylic acid [f] | 20 | | | G | | G-P | | | | |
| (Control 3) | ...do... | 0.6 | 0.96 | None | 0 | | | | | P | | | | |
| 6 | ...do... | 0.6 | 0.96 | Ethylene/ethyl acrylate/acrylic acid [f] | 20 | | | | | G-P | | | | |
| (Control 4) | Polypropylene | 2.6 | 0.90 | None | 0 | | | | | P | | | | |
| 7 | ...do... | 2.6 | 0.90 | Ethylene/ethyl acrylate/acrylic acid [f] | 20 | | | | | G-P | | | | |
| (Control 5) | Ethylene/propylene | 1.2 | 0.92 | None | 0 | | 2 | P | | P | | | | |
| 8 | ...do.[a] | 1.2 | 0.92 | Ethylene/ethyl acrylate/acrylic acid [f] | 20 | | 8 | G | | G-P | | | | |
| (Control 6) | Ethylene/ethyl acrylate [b] | 3.6 | 0.935 | None | 0 | | 2 | P | | P | | | | |
| 9 | ...do.[b] | 3.6 | 0.935 | Ethylene/ethyl acrylate/acrylic acid [f] | 20 | | 8 | G | | E-F | | | | |
| (Control 7) | Ethylene/vinyl acetate [c] | 0.7 | 0.93 | None | 0 | | | F | | F | | | | |
| 10 | ...do.[c] | 0.7 | 0.93 | Ethylene/ethyl acrylate/acrylic acid [f] | 20 | | | E | | G-E | | | | |
| (Control 8) | Ethylene/bicycloheptene [d] | 5.6 | 0.92 | None | 0 | | | | | P-G | | | | |
| 11 | ...do.[d] | 5.6 | 0.92 | Ethylene/ethyl acrylate/acrylic acid [f] | 20 | | | E | | G | | | | |

[a] 10 percent by weight combined propylene.
[b] 8 percent by weight combined ethyl acrylate.
[c] 10 percent by weight combined vinyl acetate.
[d] 5 percent by weight combined bicyclo[2.2.1]hept-2-ene.
[e] 9 percent by weight combined acrylic acid; 0 melt index; 0.948 density.
[f] 1.2 percent by weight combined ethyl acrylate; 3.6 percent by weight combined acrylic acid; 0.94 density; 2.4 melt index.
[g] 3.5 percent by weight combined vinyl acetate; 5.2 percent by weight combined acrylic acid; 0.5 melt index.
[h] 4.2 percent by weight t-butyl acrylate; 7 percent by weight combined acrylic acid; 4.2 melt index.

EXAMPLES 12–24

Table II is a compilation of data which demonstrates that ethylene/acrylic acid copolymers are usable over a wide range of comonomer composition.

TABLE II

| Example Number | Ethylene/Acrylic Acid Copolymer Additive added at 20 percent by weight to Low Density Polyethylene | Percent by Weight Comonomers in Ethylene/Acrylic Acid Copolymer | | | Grease Resistance | Printability | Adhesion to — | | |
| | | Ethyl Acrylate | Vinyl Acetate | Acrylic Acid | | | Wood | Epoxy | Saran |
|---|---|---|---|---|---|---|---|---|---|
| 12 | Ethylene/Acrylic Acid | 0 | | 3 | 4 | G | F | F | G |
| 13 | ...do... | 1.2 | | 8 | 8 | G | G | G | G |
| 14 | ...do... | 11 | | 35 | 16 | E | E | E | G |
| 15 | Ethylene/Ethyl Acrylate/Acrylic Acid | 25 | | 2.6 | | G | | | G |
| 16 | ...do... | 25 | | 2.4 | | G | | | G |
| 17 | ...do... | | | 2.5 | | G | | | F |
| 18 | ...do... | 2.4 | | 0.01 | | F | | | F |
| 19 | ...do... | 2.8 | | 0.4 | | F | | | G |
| 20 | ...do... | | | 3.6 | | G | | | G |
| 21 | ...do... | | | 4.9 | | G | | | G |
| 22 | ...do... | 4.2 | | 1.8 | | G | | | G |
| 23 | Ethylene/Vinyl Acetate/Acrylic Acid | | 22 | | | G | | | G |
| 24 | ...do... | | 9.3 | 16 | | E | | | |

EXAMPLES 25–33

Table III represents data which shows that the ethylene/acrylic acid copolymers can be used as additives to olefin high polymers over a range of from about 1 to about 80 percent by weight.

TABLE III

| Ex. No. | Ethylene/Acrylic Acid Copolymer Additive in Low Density Polyethylene | Ethyl Acrylate | Vinyl Acetate | Acrylic Acid | Percent by Weight Ethylene/Acrylic Acid Copolymer Additive | Printability | Glass | Wood | Steel | Saran | PVA/TMP |
|---|---|---|---|---|---|---|---|---|---|---|---|
| 25 | Ethylene/Acrylic Acid | | | 9 | 1 | F | | P-F | | | |
| 26 | do | | | 9 | 20 | G | | G | | | |
| 27 | do | | | 9 | 80 | E | | G-E | | | |
| 28 | Ethylene/Ethyl Acrylate/Acrylic Acid | 1.2 | | 3.6 | 1 | F | F | F | F | F | F |
| 29 | do | 1.2 | | 3.6 | 10 | G | F | F | F | G | E |
| 30 | do | 1.2 | | 3.6 | 20 | G | G | G | G | G | E |
| 31 | do | 1.2 | | 3.6 | 80 | E | E | E | E | E | E |
| 32 | Ethylene/Vinyl Acetate/Acrylic Acid | | 3.5 | 5.2 | 1 | F | | F | | | |
| 33 | do | | 3.5 | 5.2 | 20 | G | | G | | | |

What is claimed is:

1. A composition which exhibits improved adhesivity, printability, grease resistance, and stress crack resistance consisting essentially of an intimate mixture of:
   (a) from about 20 percent by weight to about 99 percent by weight of a normally solid thermoplastic olefin polymer, having a molecular weight of at least about 10,000 and a melt index of less than about 1,000, selected from the group consisting of:
   low density ethylene homopolymer
   high density ethylene homopolymer
   propylene homopolymer
   ethylene/propylene copolymer
   ethylene/ethyl acrylate copolymer
   ethylene/vinyl acetate copolymer and
   ethylene/bicycloheptene copolymer, and
   (b) from about 1 to 80 percent by weight of an ethylene/acrylic acid copolymer selected from the group consisting of ethylene/acrylic acid/vinyl acetate terpolymer and ethylene/acrylic acid/alkyl acrylate terpolymer, said ethylene/acrylic acid copolymer having a melt index of less than about 1,000 and containing from about 0.5 to 50 percent by weight of acrylic acid copolymerized therein.

2. Composition claimed in claim 1 wherein the olefin polymer is ethylene homopolymer and the ethylene/acrylic acid copolymer is ethylene/acrylic acid/vinyl acetate terpolymer.

3. Composition claimed in claim 1 wherein the olefin polymer is ethylene homopolymer and the ethylene/acrylic acid copolymer is ethylene/acrylic acid/alkyl acrylate terpolymer.

4. Composition claimed in claim 3 wherein the ethylene/acrylic acid/alkyl acrylate terpolymer is an ethylene/acrylic acid/ethyl acrylate terpolymer.

5. Composition claimed in claim 3 wherein the ethylene/acrylic acid/alkyl acrylate terpolymer is an ethylene/acrylic acid/butyl acrylate terpolymer.

6. Composition claimed in claim 1 wherein the olefin polymer is propylene homopolymer.

7. Composition claimed in claim 1 wherein the olefin polymer is ethylene/propylene copolymer.

8. Composition claimed in claim 1 wherein the olefin polymer is ethylene/ethyl acrylate copolymer.

9. Composition claimed in claim 1 wherein the olefin polymer is ethylene/vinyl acetate copolymer.

10. Composition claimed in claim 1 wherein the olefin polymer is ethylene/bicycloheptene copolymer.

11. Composition claimed in claim 1 wherein the normally solid thermoplastic olefin polymer has a melt index of less than about 100, contains at least 90 percent by weight of ethylene copolymerized therein and is present in an amount of from about 60 to 95 percent by weight and the ethylene/acrylic acid copolymer has a melt index of less than about 100, contains about 2.5 to 10 percent by weight of acrylic acid interpolymerized therein and is present in an amount of from about 5 to 40 percent by weight.

References Cited

UNITED STATES PATENTS

| | | | |
|---|---|---|---|
| 2,953,541 | 9/1960 | Pecha et al. | 260—897 |
| 2,983,704 | 5/1961 | Roedel | 260—897 |
| 2,970,129 | 1/1961 | Rugg et al. | 260—878 |
| 3,132,120 | 5/1964 | Graham et al. | 260—78.5 |
| 3,201,374 | 9/1965 | Simms | 260—837 |
| 3,201,498 | 9/1965 | Brunson et al. | 260—897 |
| 3,127,234 | 3/1964 | O'Neill | 260—897 |
| 3,248,359 | 4/1966 | Maloney | 260—897 |

FOREIGN PATENTS 582,093   11/1946   Great Britain.

MURRAY TILLMAN, Primary Examiner.

C. SECCURO, Assistant Examiner.